Sept. 9, 1930.  L. A. WILSON  1,775,380
CUTTING TOOL
Filed Jan. 7, 1929
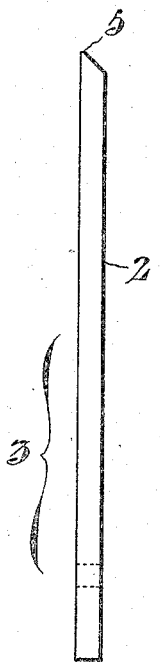
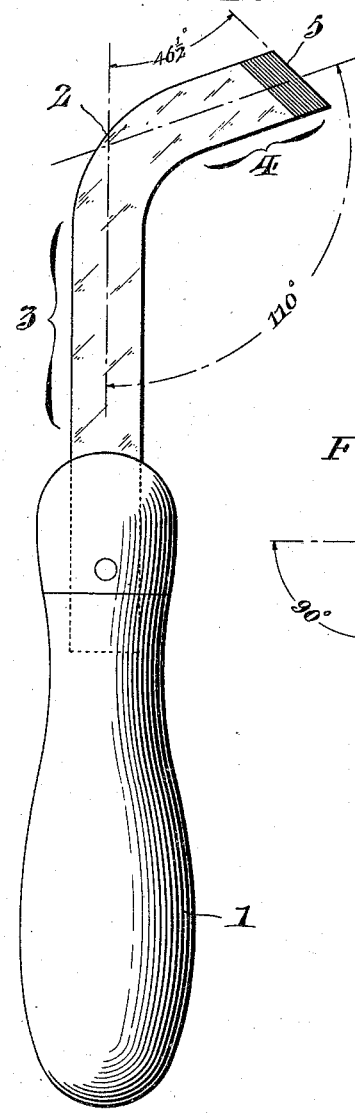
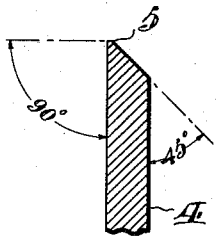
WITNESSES
INVENTOR:
Lewis Arthur Wilson,
BY
ATTORNEYS.

Patented Sept. 9, 1930

1,775,380

UNITED STATES PATENT OFFICE

LEWIS ARTHUR WILSON, OF NORTHEAST HARBOR, MAINE

CUTTING TOOL

Application filed January 7, 1929. Serial No. 330,881.

This invention relates particularly to cutting tools for use with zinc, lead or other soft metals. While adapted to a variety of uses, the invention has for its principal object the provision of a tool for cutting flashings handily and speedily. A characteristic advantage of the invention is the appreciable saving in labor accompanying the use of the tool in cutting zinc flashings.

Further objects, uses and advantages of the invention will be apparent from the description which follows and the accompanying drawings, in which there is illustrated a specific embodiment of the invention, and whereof:

Fig. I is a front elevation of the tool.

Fig. II is an edge view of the same with the handle removed; and,

Fig. III is a view, drawn to an enlarged scale and in cross-section, of the cutting element.

The tool comprises a handle 1 with a flat bar 2 inserted therein, the bar 2 being bent in the plane of its flat surface to form a shank portion 3 and a portion 4 which terminates in a straight-edged cutting element 5 running transversely of the bar, the latter portion being tempered. The bar 2 is preferably bent in such a manner that the median line of the shank portion 3 forms an angle of about 110° with the median line of the tempered portion 4. As shown in Fig. III, the straight-edged cutting element 5 has a comparatively narrow blunt edge forming an angle of approximately 90° with the flat surfaces of the bar 2, and this edge of the cutting element being approximately one-hundredth of an inch in thickness, and a comparatively wide bevelled edge forming an angle of approximately 45° with the flat surfaces of the bar 2. A sharp chisel edge is purposely avoided so that the cutting edge will last longer without resharpening and will cut a groove of substantial width in the metal to be cut, making it easier to break the metal by bending. The straight-edged cutting element 5 forms an angle of approximately 46½° with the median line of the shank portion 3 extended.

In operation the cutting tool is drawn toward one with the cutting edge held firmly on the metal to be cut. In cutting zinc flashings, for example, the tool will cut a small spiral shaving out of the zinc making a groove sufficiently deep to allow the flashing to be easily broken apart. If straight cuts are desired, the tool can be conveniently used with a straight edge, in which case it is drawn toward one with the flat surface of the bar 2 of the tool closely hugging the straight edge. The flat edge of the bar 2 serves as a guide for the tool so that a straight groove may be made in the metal to be cut. The operation is similar to the manner in which glass is cut with a pattern or straight-edge serving as a guide.

By virtue of the angle at which the flat bar 2 is bent, the tool can be conveniently gripped and balanced in the hand and drawn toward one with its cutting element 5 held firmly against the metal.

While I have described one embodiment of my invention, it will be apparent that changes may be made in the form of the device disclosed without departing from the spirit of the invention, and that the tool while primarily adapted to be used for cutting zinc may be put to a variety of other uses by the skilled artisan.

Having thus described my invention what I claim is:

1. A cutting tool for use with zinc or other soft metals comprising a handle, a flat bar having a shank portion secured to the handle, and a portion terminating in a bevelled straight-edged cutting element running transversely of the bar, said bar being bent in the plane of its flat surface so that the median line of the shank portion forms an obtuse angle with the median line of the portion terminating in the cutting element.

2. A tool for cutting zinc flashings, comprising a handle, a flat bar having a shank portion and a tempered portion terminating in a blunt straight-edged cutting element running transversely of the bar, said bar being bent in the plane of its flat surface to form an angle of approximately 110 degrees between the shank portion and tempered portion.

3. A cutting tool for use with zinc or other soft metals, including a flat bar having a shank portion and a tempered portion terminating in a straight-edge cutting element running transversely of the bar, said cutting element comprising a comparatively narrow blunt edge and a comparatively wide bevelled edge, and said bar being bent in the plane of its flat surface so that the median line of the shank portion forms an obtuse angle with the median line of the tempered portion.

In testimony whereof, I have hereunto signed my name at Northeast Harbor, Me., this 28 day of December, 1928.

LEWIS ARTHUR WILSON.